Dec. 5 1950     J. E. LANDFRIED     2,533,122
TEMPERATURE CONTROLLED ELECTRICALLY
HEATED WASHING MACHINE
Filed May 10, 1945     3 Sheets-Sheet 1
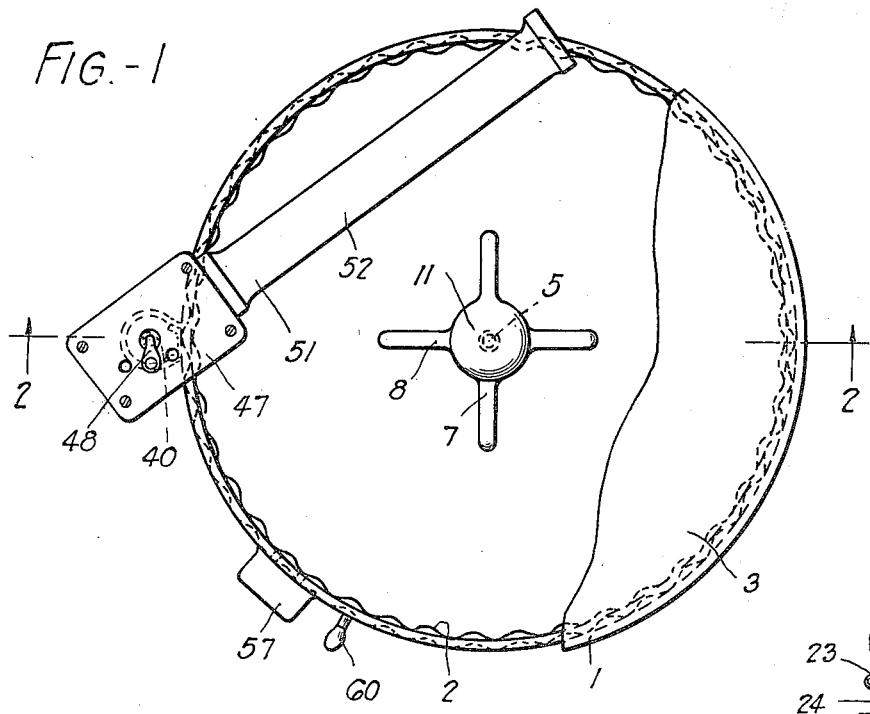
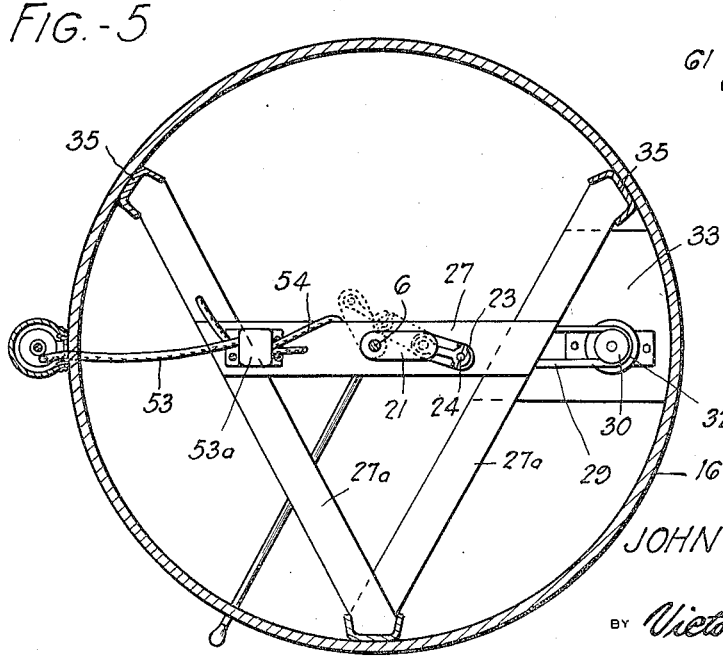
INVENTOR.
JOHN E. LANDFRIED
BY Victor J. Evans & Co.
ATTORNEYS Dec. 5 1950

J. E. LANDFRIED 2,533,122

TEMPERATURE CONTROLLED ELECTRICALLY HEATED WASHING MACHINE

Filed May 10, 1945

INVENTOR.
JOHN E. LANDFRIED

BY *Victor J. Evans & Co.*

ATTORNEYS

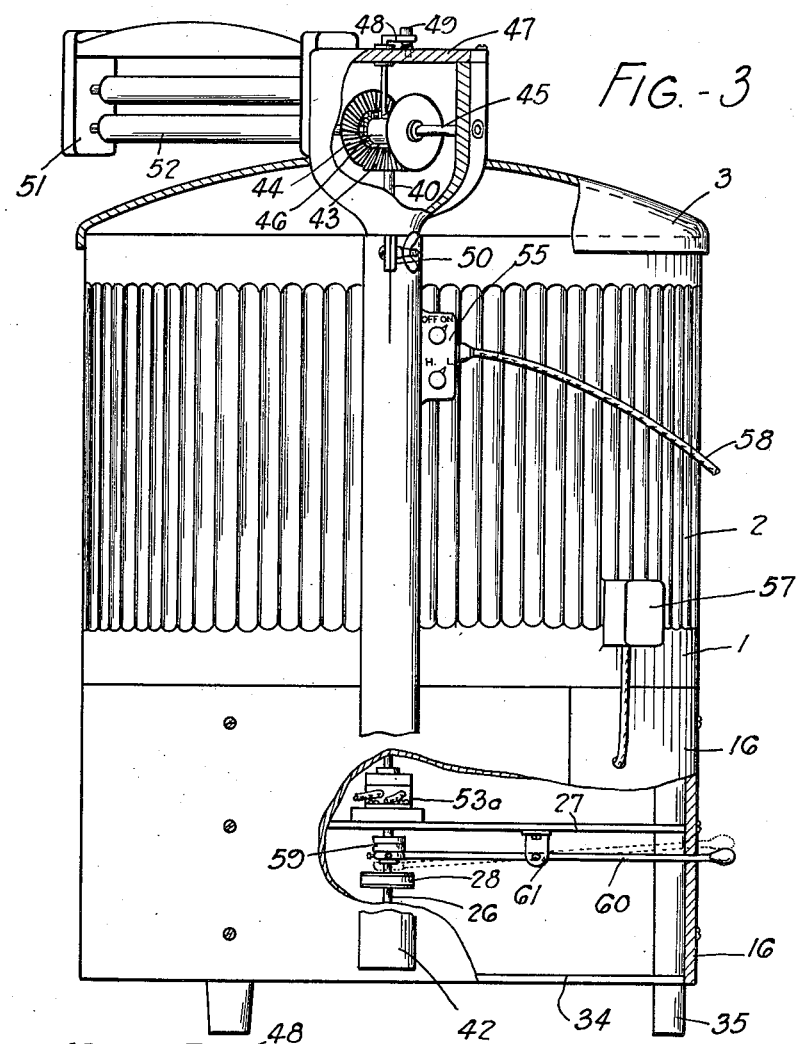
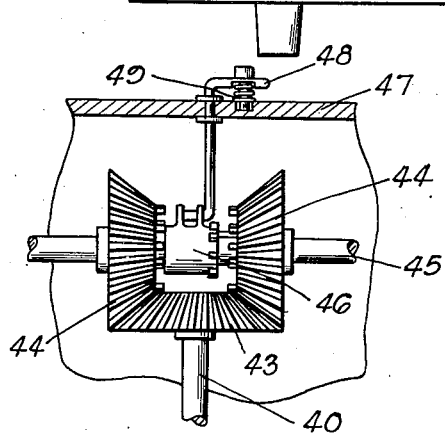
Dec. 5 1950     J. E. LANDFRIED     2,533,122
TEMPERATURE CONTROLLED ELECTRICALLY
HEATED WASHING MACHINE
Filed May 10, 1945     3 Sheets-Sheet 3
FIG.-3
FIG.-6
INVENTOR.
JOHN E LANDFRIED
BY Victor J. Evans & Co.
ATTORNEYS Patented Dec. 5, 1950

2,533,122

UNITED STATES PATENT OFFICE 2,533,122

TEMPERATURE CONTROLLED ELECTRICALLY HEATED WASHING MACHINE

John E. Landfried, East Palestine, Ohio; Elsie E. Landfried administratrix of said John E. Landfried, deceased Application May 10, 1945, Serial No. 593,031

2 Claims. (Cl. 68—15)

My present invention, in its broad aspect, has reference to improvements in combined washing machines and wringers wherein a thermostatic controlled heating element is incorporated in the machine, and simple, sturdy and efficient regulatable drive elements are employed from a power unit so that not only the temperature of the washing fluid is controlled, but also the operation of the washing machine and wringer. Another object of my invention is to provide a stainless steel, corrugated container in which an aluminum agitator is oscillatably mounted and which has provided beneath the bottom thereof with a heat insulating apron in which is contained a regulatable heating coil or resistance unit, and through which apron is arranged the dirty water outlet. Below the apron is mounted the motor and drive gearing to the agitator and wringer, and the wringer is reversible. Suitable switches for the washer and wringer, and a thermostat control for the heater are provided in readily accessible positions on the outside of the device.

Other and equally important objects and advantages of my invention will be apparent from the following description and drawings, but it is to be understood that changes in form, size, shape, construction and arrangement of parts is permissible and within the broad purview of my inventive concept and the scope of the appended claims.

In the drawings wherein I have illustrated a preferred form of my invention:

Figure 1 is a top plan view showing the washer and wringer.

Figure 3 is a side elevation partly broken away.

Figure 5 is a section on line 5—5 of Figure 2.

Figure 6 is a detail of the wringer reversing gear, and

Figure 7 is a detail of the drive elements.

In the drawings wherein like characters of reference are used to designate like or similar parts:

Figure 2:
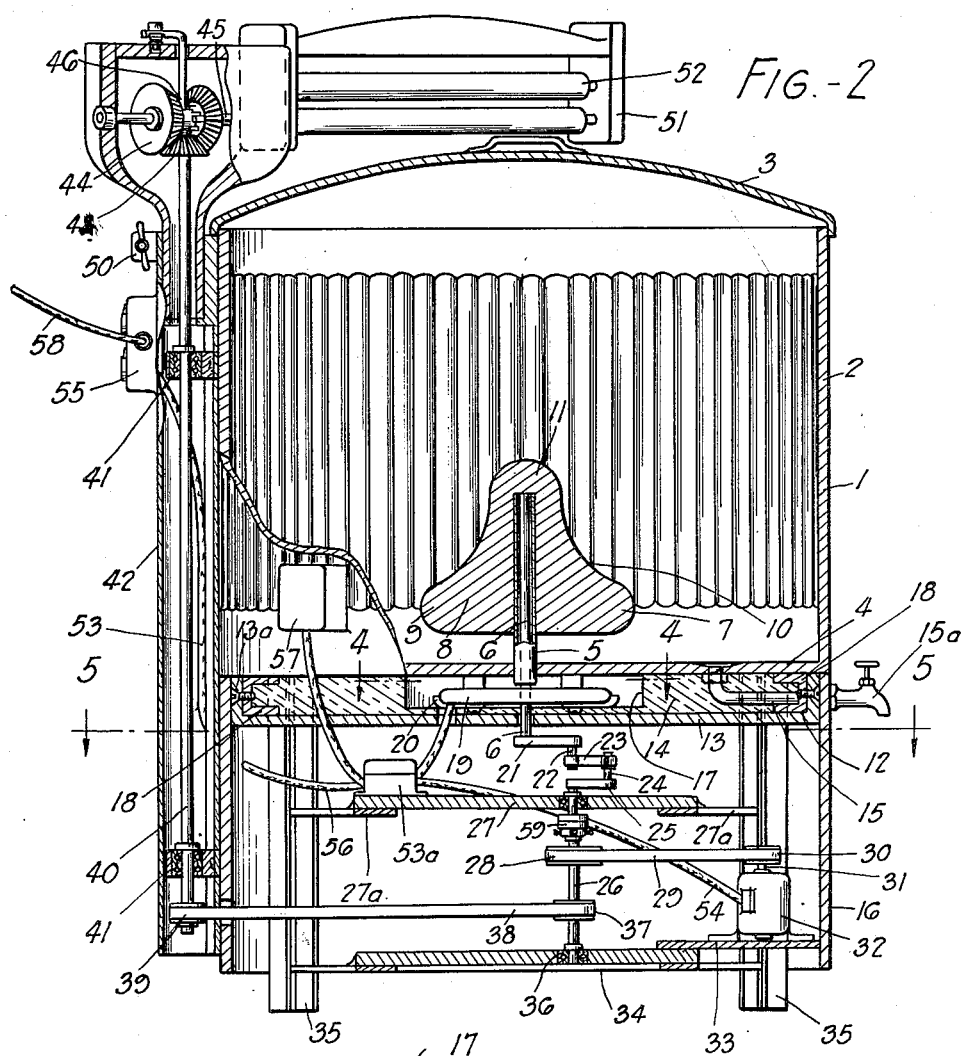
Figure 2 is a transverse section on the line 2—2 of Figure 1.
Figure 4:
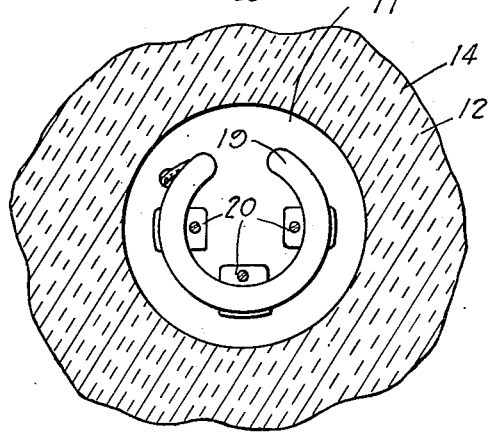
Figure 4 is a section on line 4—4 of Figure 2.

The numeral 1 designates a cylindrical stainless steel casing, which is corrugated at 2 and provided with a removable cover 3. The casing has a bottom 4 through which is mounted a tubular column 5 forming a bearing for the agitator drive shaft 6. On the drive shaft 6 is mounted a four bladed bell-shaped aluminum agitator 7, the blades 8 of which are radially opposed and have wide bases 9, an upwardly and inwardly curved outside edge 10, and a rounded-off top edge 11. Mounted beneath the bottom 4 is an apron 12 having a flanged tray part 13 to which is connected as at 13a the insulating member 14; the outlet pipe 15 extends through the tray to a spigot 15a outside the casing. The tray is carried by a cylindrical base 16 on which the casing 1 is mounted. The insulating member 14 of the tray is formed with a central circular depression 17 and a U-shaped guard rim 18. An electrical resistance or heating coil 19—see Figure 4—is supported on bracket 20 in the depression 17 to heat washing fluid in the casing or washing receptacle 1.

The shaft 6 extends through the apron and has a relatively long crank 21 to which is pivotally connected by a pin 22 adjacent its periphery, a shorter crank 23, the free end of which is pivoted on a pin 24 on the rotating arm 25 on the upper end of power shaft 26. The power shaft 26 is supported in roller bearings in a cross-piece 27 which is connected between supports 27a and a V-pulley 28 and belt 29 are connected with the shaft 26 with a similar drive pulley 30 on the shaft 31 of an electric motor 32 mounted on a plate 33 on the bottom 34 of the base 16. The bottom 34 and cross-piece 27 and supports 27a are carried on legs 35. The bottom end of the shaft 26 is mounted in roller bearings 36 in the bottom. By these means, rotation of the shaft 26 by the motor 32 rotates arm 25 which oscillates the long crank 21 through rotation of the short crank 23 to oscillate the agitator 7.

The shaft 26 carries another V-pulley 37 and belt 38 which is trained over a similar pulley 39 on the vertical wringer drive shaft 40 which is anti-frictionally journalled in bearings 41 on the outside of the casing and base and has a curved guard and enclosure 42. The upper end of the shaft carries a beveled gear 43 meshing with reversing gears 44 on the wringer drive shaft 45 which carries the gear shift elements 46, and is mounted in the housing 47. The element 46 is connected with a reversing handle 48 which has a pin catch 49. The wringer is clamped to the casing as at 50 and has a frame 51 and opposed rollers 52.

The electric circuit 53 includes a junction box 53a, and a connection 54 to the motor 32. A switch 55 in the circuit 53 is of the double variety to control the motor and also control the heating element through the connection 56 in which circuit the thermostat 57 is interpolated. The thermostat has a housing which may have communication through openings with the water in the casing. A lead-in cable 58 is connected with the switch. A clutch 59 including clutch elements 59a and 59b is mounted on shaft 26—see Figure 7—and is operated through lever 60 pivoted to the member 27 as at 61.

From the foregoing, it is believed that the operation and advantages of my invention will be apparent, but it is again emphasized that interpretation of its scope should only be conclusive when made in the light of the subjoined claims.

I claim:

1. In a washing machine comprising a cylindrical container mounted on a substantially vertical axis and having an internal wall axially corrugated and a bottom, a thermostatic device externally attached to the outside surface of the external wall in heat-receiving relationship with the same and operative in response to a predetermined temperature change within said container, a bearing sleeve extending upwardly from said bottom parallel with the longitudinal axis of said container, an agitator in said container and rotatably mounted on said bearing sleeve for agitating contents of said container, a cylindrical base mounted on a substantially vertical axis and supporting said cylindrical container, a flanged cylindrical member on said base adjacent the bottom of said container, a thermal insulating member supported by said flanged cylindrical member against said container bottom, a driven shaft attached to said agitator for driving the same, said shaft extending through said flanged cylindrical member and said container bottom and rotatably mounted in said bearing sleeve, said insulating member having a circular depression about said driven shaft, an electrical heating element in said circular depression and positioned about said driven shaft for heating contents of said container, an electrical circuit connecting said heating element to a source of energy through said thermostatic device whereby the latter can control the heating effect of said heating element in response to said predetermined temperature change within the container, a crank secured to said driven shaft, a driving shaft, means mounting parallel to the same but offset from said driven shaft, a crank on said driving shaft, a link, means pivotally connecting the ends of said link to said driven shaft and driving shaft cranks, respectively, a source of power, and manually-operated clutch means connecting said driving shaft to said source of power.

2. In a washing machine comprising a cylindrical container mounted on a substantially vertical axis and having an internal wall axially corrugated and a bottom, a thermostatic device attached to the outside surface of the external wall in heat-receiving relationship with the same and operative in response to a predetermined temperature change within the said container, a bearing sleeve extending upwardly from said bottom, an agitator in said container and rotatably mounted on said bearing sleeve for agitating contents of said container, a base mounted on a substantially vertical axis and supporting said cylindrical container, means thermally insulating the bottom of said container, a driven shaft attached to said agitator for driving the same, said shaft extending through said sleeve, bottom and insulating means, said insulating means having a circular depression about said driven shaft, an electrical heating element in said circular depression and positioned about said driven shaft for heating contents of said container, an electrical circuit connecting said heating element to a source of energy through said thermostatic device whereby the latter can control the heating effect of said heating element in response to said predetermined temperature change within the container, a crank secured to said driven shaft, a driving shaft, means mounting the same parallel to but offset from said driven shaft, a crank on said driving shaft, a link, means pivotally connecting the ends of said link to said driven shaft and driving shaft cranks, respectively, a source of power, and manually operated clutch means connecting said driving shaft to said source of power.

JOHN E. LANDFRIED.

REFERENCES CITED

The following references are of record in the file of this patent:

UNITED STATES PATENTS

| Number | Name | Date |
|---|---|---|
| 299,266 | Richardson | May 27, 1884 |
| 1,816,033 | Wilsey | July 28, 1931 |
| 1,983,836 | Berquist | Dec. 11, 1934 |
| 2,005,641 | Stanitz | June 18, 1935 |
| 2,143,730 | Franz | Jan. 10, 1939 |
| 2,179,876 | Bones | Nov. 14, 1939 |
| 2,180,136 | Altofer | Nov. 14, 1939 |
| 2,248,007 | Michaels | July 1, 1941 |